United States Patent [19]

Brown et al.

[11] 3,899,535

[45] Aug. 12, 1975

[54] CORROSION INHIBITOR COMPOSITION AND PROCESS

[75] Inventors: Louise H. Brown, Santa Monica; Ronald Swidler, Pasadena, both of Calif.

[73] Assignee: Tallow Company, Salinas, Calif.

[22] Filed: Oct. 3, 1973

[21] Appl. No.: 403,337

Related U.S. Application Data

[63] Continuation-in-part of Ser. Nos. 111,495, May 22, 1961, abandoned, and Ser. No. 504,217, Oct. 23, 1965, abandoned.

[52] U.S. Cl. ............ 260/570.8 R; 71/121; 252/8.6; 252/8.8; 252/117; 252/311.5; 252/357; 252/390; 252/501.1; 260/404; 260/413; 260/465 B; 260/567.6 M; 260/567.6 P
[51] Int. Cl. ............................................ C07c 87/28
[58] Field of Search ............................ 260/570.8 R

[56] References Cited
UNITED STATES PATENTS

| | | |
|---|---|---|
| 2,419,327 | 4/1947 | Wachter et al. ............ 260/570.8 X |
| 2,441,518 | 5/1948 | Suter et al. ...................... 260/570.8 |
| 2,758,086 | 8/1956 | Stuart et al. ................. 260/570.8 X |

*Primary Examiner*—R. V. Hines
*Attorney, Agent, or Firm*—Lyon & Lyon

[57] ABSTRACT

This invention relates to novel compounds having improved corrosion inhibiting properties and having the formula:

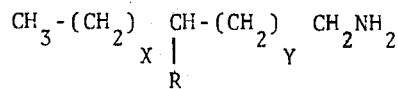

wherein Y is greater than 3 and X + Y is 15 and R is aromatic.

5 Claims, No Drawings

CORROSION INHIBITOR COMPOSITION AND PROCESS

This application is a continuation-in-part of Brown et al. applications, Ser. No. 111,495 filed May 22, 1961, and now abandoned and Ser. No. 504,217 filed Oct. 23, 1965, now abandoned.

This invention relates to the preparation of corrosion inhibitors and has particular reference to corrosion inhibitor compositions useful in connection with the protection of ferrous metals against corrosion.

A primary object of the present invention is to provide a novel class of organic amines useful, inter alia, as corrosion inhibitors or as components of corrosion inhibitor compositions.

A further object of the present invention is to provide novel corrosion inhibitor compounds or compositions constituting or containing aryl stearyl amines.

A further object of the present invention is to provide a novel process for producing amine-type corrosion inhibitors.

Other objects and advantages of this invention it is believed will be readily apparent from the following detailed description of preferred embodiments thereof.

Briefly, this invention comprehends within its scope the discovery of the preparation of aryl stearic amines, and the further discovery that such compounds constitute novel and improved corrosion inhibitors for ferrous metals. The aryl stearic amines used in the present invention are prepared by first converting an aryl stearic acid (preferably prepared by alkylating an aromatic compound with oleic acid or a derivative thereof in the presence of an acid-activated clay catalyst) to the chloride, then converting the aryl stearyl chloride to the amide, then converting the amide to the nitrile which in turn is converted to the amine.

The amines of this invention which have been found especially effective in corrosion inhibiting compositions may be produced by first alkylating aryl compounds with unsaturated fatty acids and then converting the acid to an amine and can be represented by the following formula:

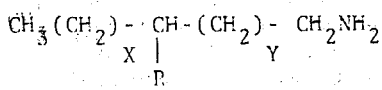

$$CH_3(CH_2)_x - CH - (CH_2)_y - CH_2NH_2$$
$$\qquad\qquad\qquad\;\; | $$
$$\qquad\qquad\qquad\;\; R$$

where:
R is an aryl radical
X is an integer from 0 to 20
Y is an integer from 1 to 21
The sum of X and Y is from 7 to 21

The aryl radical may contain one or more phenyl groups, e.g., the radical may be derived by alkylating with an unsaturated fatty acid. Aryl compounds within the scope of this invention are benzene, naphthalene and anthracene. The aryl radical may be substituted with lower alkyl groups such as methyl, ethyl, propyl, butyl, pentyl and hexyl. In addition, the aryl radical may be substituted with other nondeleterious substituents such as hydroxyl groups and halides such as chloride, etc. Examples of suitable substituted aryl groups are anisole, phenol, cresol, chlorobenzene and naphthol.

The unsaturated fatty acids which are suitable in preparing the corrosion inhibitor component of this composition include those unsaturated fatty acids having from about 10 to about 24 carbon atoms, the preferred acids for corrosion inhibition containing 14 to 18 carbon atoms. The fatty acid may contain one or more double bonds, although those containing one double bond are preferred in preparing the corrosion inhibitor. Examples of fatty acids which may be used in this invention are undecylenic, oleic, palmitoleic, petroselenic, eurcic and linoleic.

The aryl groups are normally present on carbon atoms which are at least 6 carbons away from the carboxyl or amine group, being introduced in the vicinity of the double bond. See Smith et al., *Journal of Organic Chemistry*, Mar. 1965, Page 885. Although the exact point at which the aryl group is attached will vary with reaction conditions and the exact nature of the aryl compound and unsaturated fatty acid used, essentially no substitution occurs on the 2-carbon atom and carbon atoms adjacent thereto. In the case of oleic acid, no substitution occurs until the 6-carbon atom. Because of the predominance of aryl substitution at the carbon atoms adjacent to the double bond, the 9- and 10-carbon atoms in oleic acid, the aryl substituted oleic acids are commonly referred to as C9-10 aryl oleic acids and the amines derived therefrom are described as C9-10 amines.

The following specific examples are illustrative of the compositions and process of the present invention, but it is to be understood that the invention is not to be limited to the specific details thereof. The oleic acid used in the examples contain small amounts of $C_{14}$ and $C_{16}$ unsaturated acid.

EXAMPLE 1

Naphthyl Stearyl Amine

Oleic acid (169g, 0.6 mole), naphthalene (308g, 2.4 mole) and "Filtrol" GR 58 were heated and stirred 200° for 7 hours. The reaction mixture was cooled, diluted with chloroform and the clay removed by filtration. The filtrate was collected and the solvent removed. The resultant reaction mixture was submitted to vacuum distillation to yield the following fractions:

| Fraction | bp | wt.(g) | n | Neutral Equivalent |
|---|---|---|---|---|
| 1 | 122–129 | 218 | | Naphthalene |
| 2 | 124–196/1mm | 7 | Solid | 304 |
| 3 | 165–248/.2 | 10.5g | | 386 |
| 4 | 248–275/0.5 | 116g | $n^{23}1.5317$ | 390 |
| 5 | Residue | 60 | 1.5318 | 576 |

A 102g (0.25 mole) portion of fraction 4, 9, [10]-naphthalene-stearic acid, was heated at reflux for 1.5 hours with 60g (0.5 mole) thionyl chloride. The excess thionyl chloride was removed in vacuo at the aspirator and the residual oil dissolved in an equal volume of ether. This ethereal solution was added over a two-hour period to 200 ml of cold concentrated ammonia maintaining vigorous agitation. Enough ether was added to keep the mixture fluid. Upon completion of the addition saturated aqueous sodium chloride was added to break the emulsion. The ethereal layer was separated and washed with dilute hydrochloric acid, 10% sodium bicarbonate, water and finally saturated sodium chloride. The ethereal extract was dried over magnesium sulfate, filtered and the ether evaporated leaving 99g of the brown oily amide.

The above amide (89g) was dissolved in 150 ml of benzene and 70g of phosphorous pentoxide was added. The mixture was stirred and heated at reflux for 15 hours. The mixture was poured into ice water. The organic layer was separated and the water layer extracted with ether. The organic extracts were combined and washed repeatedly with water until neutral. After drying over magnesium sulfate the solvent and solid were removed leaving 81g of a brown oil which was submitted to vacuum distillation. Listed are the boiling points, weights and refractive indexes at 22°C: (1) 147°–198°, 2.5g; (2) 198°–226°, 2.19, 1.4945; (3) 226°–239°, 49.5g, 1.5294; (4) 239°–253°, 13.5g, 1.5287; (5) 8.0g residue.

Fractions 3 and 4 (63g), naphthylstearonitrile, were combined and dissolved in 50 ml of absolute ethanol. The solution was added slowly to a suspension of 28g of sodium in 100 ml of boiling toluene while maintaining rapid stirring. After complete addition of the nitrile had been effected 50 ml of ethanol was added and then 10 ml of water. The layers were separated and the aqueous alcoholic phase extracted with benzene. The benzene and the solvents removed leaving 50g of residual oil which was submitted to vacuum distillation at 0.5 mm. Listed are the boiling point, weight and refractive index of the fractions: (1) 175°–215°, 1.0g, 1.5017; (2) 215°–240°, 36g, 1.5108; (3) 7.0g residue. Fraction 2 had a neutral equivalent of 466 whereas theory for naphthylstearyl amine is 391. The infrared spectrum of this material showed the presence of amide contaminants.

Fraction 2 was dissolved in 50 ml of absolute ethanol and a solution of 5.6g (0.044 mole) of oxalic and dissolved in a minimum amount of ethanol was added. A white crystallene precipitate formed immediately. The solid was collected, after chilling the mixture to 0°, and washed with cold acetone. The oxalate was slurried with 10% sodium hydroxide overnight. The oil which appeared was extracted with ether. The ethereal layer was washed repeatedly with water and saturated aqueous sodium chloride. The ethereal extract was dried over magnesium sulfate, filtered and the ether evaporated. The residual oil was distilled at 0.8 mm. Yield 21g of naphthylstearyl amino (bp 220–227; $n^{20}$ 1.5122; neutral equivalent, 410).

EXAMPLE 2

Phenyl Stearyl Amine

Phenylstearic acid (50g, obtained from the Barlow Chemical Co.) and thionyl chloride (33g) were refluxed on the steam bath for 3 hours. Excess thionyl chloride was removed at aspirator pressure, and the residual liquid was dissolved in an equal volume of ether and added to chilled 28% aqueous ammonia (100 ml) with vigorous stirring. During the addition (0.75 hr.) portions (50 ml) of ether were added at intervals to keep the mixture fluid.

After addition was complete, the mixture was stirred one-half hour and the layers separated. The organic layer was washed with water, dilute hydrochloric acid and salt solution until the washings were neutral. The extract was then dried over magnesium sulfate, filtered from the drying agent and the solvent removed to give 40g of a brown waxy low-melting solid. The amide (40 g) was dissolved in benzene (100 ml), phosphorous pentoxide (30 g) was added and the mixture refluxed for 18 hours. The mixture was extracted with ether, washed with water, dilute sodium bicarbonate, salt solution and drived over magnesium sulfate. The solvent was evaporated, leaving 37g of a dark brown oil. The oil was distilled in vacuo, bp 140°–190°—0.05 mm to yield 31g of a dark brown oil which was redistilled into 3 fractions: (1) bp 20°–178°/0.06m (2gm) $n^{25}$1.4881; (2) by 178°–190°/0.06m (26gm) $n^{25}$1.4870; (3) bp 190°–195°/0.06 mm (2gm) $n^{25}$1.4880.

The nitrile (cut 2, 20gm) was dissolved in absolute ethanol (30 ml) and added slowly to sodium metal (9gm) in refluxing toluene (35 ml). The mixture became viscous and more toluene was added. After addition was complete, ethanol was added, followed by water. The mixture was poured into water and extracted with ether. The ether extract was washed, dried and distilled in vacuo into 3 fractions: (1) bp 20°–173°/0.13 mm (2gm); (2) 173°–187°/0.13 mm (14gm); (3) 187°–190°/0.13 mm (1g). Neutral equivalent of cut 2, 405. The amine was purified via its oxalate salt (Example 1), and on distillation had bp 165°–170°/0.1 mm, $n^{28}$1.4872, neutral equivalent 384.

EXAMPLE 3

Anisole Stearyl Amine

Anisole (162g, 1.5 mole), methyl oleate (85g, 0.3 mole) and "Filtrol" GR 13 (30g) were heated at reflux for 4 hours. The mixture was filtered and the clay washed with benzene and acetone. The solvent and anisole were removed in vacuo and the residual oil submitted to vacuum distillation at 0.1 mm to yield (i) 10g, 100°–175°, $n^{34}$1.4633 and (ii) 69g, 180°–200°, $n^{24}$1.4878. Fraction (ii) was methyl 9, [10]-anisylstearate, 50g of which was submitted to saponification with alcoholic potassium hydroxide. The free acid was liberated, extracted with ether and recovered.

The recovered acid was heated on the steam bath for three hours with thionyl chloride (35g), dissolved in an equal volume of ether and added to excess cold concentrated aqueous ammonia. The organic layer was washed, dried and the solvent removed. The residue was dissolved in an equal volume of benzene, and phosphorous pentoxide (30g) was added in 3gm portions over a period of four hours. The mixture was refluxed 15 hours, water was added to decompose excess $P_9O_5$, the organic layer washed and dried. The solvent was removed and the residue distilled in vacuo to give 30g of a yellow viscous oil, bp 180°–220°/0.2 mm. This oil was redistilled in vacuo. The fraction (22g) having bp 185°–202°/0.1 mm, n 1.4920 was 9,[10]-anisylstearonitrile.

Reduction to the amine was accomplished by dissolving the nitrile (16gm) in absolute ethanol (10g) and adding slowly to a mixture of metallic sodium (3.7g) in refluxing toluene (35 ml). After addition, 16 ml absolute ethanol was added, followed by 10 ml water. Upon cooling the organic layer was separated, washed, dried and solvent removed to yield 16gm of risidual yellow-red oil. The amine was purified via its oxalate salt as in Example 1 (bp 165°–180°/0.06 mm, $n^{25}$1.4922, neutral equivalent 394, theoretical 376).

EXAMPLE 4

Tolyl Stearyl Amine

The tolystearic acid used in this example was prepared as follows: Toluene (1389, 1.5 mole), oleic acid (84.6g, 0.3 mole) and "Filtrol" GR 58 (10g) were placed in a bomb cup. The bomb was assembled and flushed with nitrogen, then heated at 188°–200°C for 2 hours. At the end of this time the bomb was cooled, and the material was filtered. The filter cake was washed with benzene. The filtrate and washings were combined and evaporated at aspirator pressure. The residual oil was distilled in vacuo giving five fractions. Listed are boiling point, weight and refractive index: (1) 59°–161°C/0.7 mm, 2.3g, $n^{24}1.4725$; (2) 161°–198°C/0.7 mm, 29.2g; (3) 195°–220°C/0.5 mm, 5.4g; (4) 220°–235°C/0.5 mm, 37.2g, $n^{24}1.4913$; and (5) residue, 19.6g, $n^{24}1.4965$. Fraction (4) was 9, [10]-p-tolylstearic acid. Neutral equivalent calculated: 374.5. Found: 368. The yield was 34.7% based on oleic acid.

Tolylstearyl amine was prepared as follows: 9, [10]-tolyl-stearic acid (20g) was heated with thionyl chloride (14g) on the steam bath for about four hours. Excess thionyl chloride was removed with as aspirator, the residue was dissolved in an equal volume of ether and added to chilled 28% aqueous ammonia (50 ml). The organic layer was separated, washed, dried and the solvent removed to yield 19g of a dark brown oil. This oil was then treated similarly to the other examples; viz, with phosphorous pentoxide, followed by reduction of the crude nitrile to yield 15gm of crude amine. The amine, when purified through the oxalate salt and distilled in vacuo (bp 155°–170°/0.06 mm, $n^{28}1.4878$, neutral equivalent 381). The aryl stearly amines of the present invention are useful as corrosion inhibitors for ferrous metals, such as for example when added in small amounts (preferably 25 or 50 parts per million, generally less than 1% by volume) to fuel oil, drilling mud compositions and the like, or when used as a metal coating. Thus, the compounds were each evaluated in a standard humidity cabinet text. In carrying out this test, 25 and 50 ppm solutions of each aryl stearyl amine in methylene chloride were prepared. Steel test panels were cleaned and weighed, dipped into the solutions and slowly removed, allowing the solvent to evaporate and the compound to form a protective coating. The coated panels were then held in the humidity cabinet for 5 days under conditions of 105°F, 100% relative humidity. Under the test conditions, the naphthyl stearyl amine exhibited a clear superiority to several commercially available amine-type inhibitors, and the other aryl stearyl amines were of almost equal effectiveness as compared to the best commercially available material.

EXAMPLE 5

The corrosion inhibition of five different amines was tested. The testing procedure is set forth below. The phenylstearyl amine was prepared in accordance with Example 2 of this application. Oleyl amine and octadecyl amine were commercially obtained from Armmour Industrial Chemical Company and purified by distillation. Beta-methylphenethyl amine was prepared in accordance with Example I of Suter U.S. Pat. No. 2,441,518. 10-methyl-10-phenyl-decylamine was prepared from phenyl undecanoic acid.

Cold-rolled 18 gage steel sheets, purchased from Ducommun Metals & Supply Co. (4890 South Alameda Street, Los Angeles, Calif. 90054), are cut into ¾ × 2 inch specimens, cleaned and degreased by rubbing with a damp cloth, then rinsing with acetone and methylene chloride. These specimens are weighed individually to the nearest 0.1mg, then stored in a dessiccator. All handling after degreasing is by means of forceps and clamps. At no time are the specimens allowed to come in contact with the skin.

The test solution, made up of 200g of 10% aqueous HCl and 200g of a benzene solution containing a known amount of the inhibitor, is placed in a 500 ml Erlenmeyer flask. A steel specimen is mounted on a glass holder and lowered to the flask bottom (away from the center to clear the magnetic bar). The glass holder, in turn, is immobilized against the neck of the flask with a plug of glass wool. No condenser is needed because loss by evaporation is negligible. The stirrer is started, and its speed adjusted until the liquid layers are emulsified. Occasionally, a stirrer motor will overheat and cause the temperature of the flask to rise. Any heat exchange between the stirrer motor and flask must be minimized by either placing insulation under the flask or lifting the flask away from the stirrer, or both. The test is completed after 5 hours, and the panel is rinsed under tap water, dried and reweighed.

Corrosion rate, calculated from the weight loss data, is expressed in milligrams per square decimeter per day (24 hours), abbreviated mdd. Inhibition is calculated as percentage of reduction in weight loss based on uninhibited panels:

$mdd = 1.02 \times$ (Weight Loss, mg)
$W_o =$ Mdd of Uninhibited panel (blank)
% Inhibition $= 100(W_o - W)/W_o$ where $W =$ Mdd of inhibited panel.

The amount of corrosion inhibition for each compound at a concentration of 50 ppm is set forth in the table below.

|  | Percent |
| --- | --- |
| phenylstearyl amine | 56 |
| oleyl amine | 45 |
| octadecyl amine | 39 |
| beta-methylphenethyl amine | 24 |
| 10-methyl-10-phenyl-decylamine | 19 |

Derivatives of the phenylstearyl amines of this invention have utility in a variety of protective coating operations such as ap permanent protective coating for structures exposed to the atmosphere or sunk into the earth; as an impermeable binder to stabilize porous earth or irrigation ditches, dams or levies; drilling fluids for oil-well operations and the like; as the main material for paving and maintaining roads and highways, and in other similar applications where their particular properties can be utilized.

Bituminous dispersions or emulsions are generally prepared by dispersing molten bitumen, such as asphalt, in or with water in the presence of an emulsifying agent, to form a cationic, anionic or nonionic dispersion depending upon the nature of the emulsifying agent. The cationic and anionic emulsion dispersions are much more common that the nonionic dispersions. Generally such dispersions must meet five important criteria, namely stability, demulsibility, bitumen content, viscosity and the ability to adhere to aggregate under operating conditions. The last requirement is particularly important and significant as bitumen dispersions, especially asphalt emulsions, are notoriously poor in adhesion properties and even the best of them generally have only a limited range of utilities.

It has been discovered that certain amines and diamines derived from the phenylstearyl amines of this invention effect substantial improvement in the adhesion of bitumen binder to aggregate surface in bitumen dispersions.

EXAMPLE 6

Exemplary oil-in-water type dispersions were formulated and evaluated. The basic formulation was an asphalt based drilling fluid having the following composition by weight:

| 30% | Asphalt (85–100 penetration) |
| 30% | Diesel Fuel |
| 2–3% | (in water) of either: N,N,N-trimethyl-N-phenylstearyl ammonium chloride or N,N,N',N'-pentamethyl-N,N'-trimethylene-N'-phenylstearyl diammonium dichloride |
| 40% | Water |

To this was added (into the asphalt) 2% by weight of the total dispersion of the chemical noted in Table I.

Adhesion and resistance to removal by water of the formulations were evaluated by two tests: In test No. 1 (for resistance to water removal) 100 grams of 35 mesh Ottawa Sand were wetted with 5 grams of water, and 10 grams of the formulation being tested were added. The mixture was agitated and then allowed to stand at room temperature for 30 minutes. The coated mass was then immersed in 300 grams of water and, after immersion for 1 hour, an estimation of the percent coating that remained on the sand was recorded. Results are shown in Table I.

In text No. 2 (for adhesion ability) 100 grams of 35 mesh Ottawa Sand was weighed into 300 ml of water. To the water was added 20 grams of the formulation being tested. The entire mass was agitated for 3 minutes, allowed to settle and remain static for 30 minutes, and then an estimate of the percent coating obtained upon the sand was recorded. Results are shown in Table I.

TABLE I

| Run No. | Adhesion Agent Added | Test No. 1 | Test No. 2 |
| --- | --- | --- | --- |
| 1. | Control (basic formulation) | 50% | 30% |
| 2. | Phenylstearylamine (using the quaternary emulsifier) | 90 | 80 |
| 3. | Phenylstearylamine at 1% conc. (using the diquaternary emulsifier) | 85 | 75 |
| 4. | Phenylstearyl trimethylene diamine at 1% conc. | 94 | 90 |
| 5. | Diphenylstearylamine | 90 | 80 |
| 6. | Phenylstearic acid salt of phenylstearylamine (50/50 proportions of acid/amine) | 95 | 92 |
| 7. | Phenylstearic acid salt of phenylstearylamine (32/68 proportions) | 92 | 90 |
| 8. | Phenylstearic acid salt of N-phenylstearyl trimethylene diamine (64/36 proportions) | 99 | 97 |
| 9. | Oleic acid salt of N-phenylstearyl trimethylene diamine (60/40 proportions) | 99 | 97 |
| 10. | Tall oil-fatty acid salt of N-phenylstearyl trimethylene diamine (61/39 proportions) | 99 | 95 |
| 11. | Dodecyl benzene sulfonic acid salt of N-phenylstearyl trimethylene diamine (50/50 porportions) | 85 | 80 |
| 12. | 1% conc. of oleic acid salt of tolylstearylamine (50/50 proportions) | 90 | 85 |
| 13. | 1% conc. of oleic acid salt of xylylstearylamine (50/50 porportions) | 90 | 85 |

EXAMPLE 7

Completion fluid formulations for use in water injection petroleum operations were evaluated by test No. 1 and test No. 2 as set forth in Example 6. The basic oil and solvent based completion fluid had the following composition;

| 28% | Diesel Fuel |
| 27% | Toluene |
| 45% | Tap Water |
| 3% | N,N,N',N'-pentamethyl-N,N'-trimethylene-N'-phenylstearyl diammonium dichloride (in the water phase) |

To the above formulation was added in the solvent blend, 2% of the chemicals set forth in Table II. Exemplary results are shown in Table II.

TABLE II

| Run No. | Adhesion Agent Added | Test No. 1 | Test No. 2 |
| --- | --- | --- | --- |
| 1. | Control (basic formulation) | 25% | |
| 2. | Phenylstearylamine | 90 | 80 |
| 3. | Diphenylstearylamine | 90 | 80 |
| 4. | N-phenylstearyl trimethylene diamine | 98 | 98 |

TABLE II—Continued

| Run No. | Adhesion Agent Added | Test No. 1 | Test No. 2 |
|---|---|---|---|
| 5. | Phenylstearic acid salt of N-phenylstearyl trimethylene diamine (64/36 proportions) | 82 | 80 |
| 6. | Oleic acid salt of N-phenylstearyl trimethylene diamine (60/40 proportions) | 84 | 80 |
| 7. | Tall oil-fatty acid salt of N-phenylstearyl trimethylene diamine (61/39 proportions) | 84 | 80 |
| 8. | Dodecyl benzene sulfonic acid salt of N-phenylstearyl trimethylene diamine (50/50 proportions) | 85 | 80 |

EXAMPLE 8

A petroleum resin-solvent formulation, useful as a drilling fluid, completion fluid and the like, was evaluated by Test No. 1 and Test No. 2 as set forth hereinabove. The basic formulation was:

50% Resin (Picco 100)
    15% Toluene
    35% Water
    2% N,N,N',N'-pentamethyl-N,N'-
        trimethylene-N'-phenylstearyl
        diammonium dichloride (in the
        water phase)

The petroleum resin used above was derived from the maltene fraction of asphalt, although any petroleum resin may be used. To the resin in the above formulation was added 2% oleic acid salt of N-phenylstearyl trimethylene diamine (64/36 proportions). The results were:

| Run No. | Adhesion Agent Added | Test No. 1 | Test No. 2 |
|---|---|---|---|
| 1. | Control (basic formulation) | 40% | 20% |
| 2. | Phenylstearyl trimethylene diamine salt | 85 | 80 |

EXAMPLE 9

A petroleum wax (microcrystalline wax) dispersion, useful as a drilling fluid, completion fluid and the like was evaluated by Test No. 1 and Test No. 2. The basic formulation was:

60% Microcrystalline wax 160°S.P.
    40% Water
    2% N,N,N',N'-pentamethyl-N,N'-
        trimethylene-N'-phenylstearyl
        diammonium dichloride (in the
        water phase)

Results, using 1% of the phenylstearyl diamine salt described in Example 8 above were:

| Run No. | Adhesion Agent Added | Test No. 1 | Test No. 2 |
|---|---|---|---|
| 1. | Control (basic formulation) | 30% | 20% |
| 2. | Phenylstearyl diamine salt | 85 | 80 |

EXAMPLE 10

A rubberized-asphalt dispersion, useful as a drilling fluid, completion fluid and the like, was evaluated by Test No. 1 and Test No. 2. The rubber ingredient utilized was a neoprene latex, but any natural rubber or synthetic rubber (such as GR-A acrylonitrile rubber, GR-I butyl rubber, GR-N nitrile rubber, GR-P polysulfide rubber, and GR-S styrene rubber including modified or extended rubbers as well as chloroprene rubbers) may be substituted therefore.

The basic formulation was:

50% Asphalt (85–100 penetration)
    15% Neoprene latex (Du Pont 950)
    35% Water
    2% N,N,N',N'-pentamethyl-N,N'-
        trimethylene-N'-phenylstearyl
        diammonium dichloride (in the
        water phase)

To the above formula was added (into the asphalt) 1% of the phenylstearyl diamine salt of Example 8. Results of the evaluation were:

| Run No. | Adhesion Agent Added | Test No. 1 | Test No. 2 |
|---|---|---|---|
| 1. | Control (basic formulation) | 40% | 20% |
| 2. | Phenylstearyl diamine salt | 95 | 90 |

EXAMPLE 11

Phenylstearic acid soaps and phenylstearic acid derivatives were evaluated as emulsifiers and in some instances compared with standard commercial products.

All of the emulsions were prepared by adding the water to the oil at 60°C and mixing with a propeller type agitator. With the exception of the polyethylene emulsions, all preparations are with the lowest possible emulsifier level for the specified manufacturing procedure.

Recorded in Table III are emulsions prepared with a variety of soaps.

TABLE III – SOAP EMULSIONS

| Materials Used | 1 | 2 | 3 | 4 | 5 | 6 | 7 | 8 | 9 | 10 |
|---|---|---|---|---|---|---|---|---|---|---|
| Isoparafinn oil | 22.50 | 22.50 | 22.50 | 22.50 | 23.50 | 23.50 | — | — | — | — |
| Mineral oil | — | — | — | — | — | — | 23.50 | 23.50 | 22.50 | — |
| Polyethylene 629 | — | — | — | — | — | — | — | — | — | 10.37 |
| Neo Fat 18–55 | — | — | 2.33 | 2.28 | — | — | — | — | — | — |
| Neo Fat 94–04 | 2.33 | 2.28 | — | — | — | — | — | — | — | 1.81 |
| Phenylstearic acid | — | — | — | — | 1.43 | 1.40 | 0.80 | 0.40 | 2.00 | — |
| Ethofat 60/15 | — | — | — | — | — | — | 0.50 | 1.00 | — | — |
| Potassium hydroxide | — | 0.22 | — | 0.22 | — | — | — | — | — | — |
| Sodium hydroxide | 0.17 | — | 0.17 | — | 0.07 | 0.10 | — | — | — | — |
| Morpholine | — | — | — | — | — | — | 0.20 | 0.10 | 0.50 | 1.81 |
| Water | 75.00 | 75.00 | 75.00 | 75.00 | 75.00 | 75.00 | 75.00 | 75.00 | 75.00 | 75.00 |
| % Neutralization | 50 | 50 | 50 | 50 | 44 | 63 | 100 | 100 | 100 | 403 |

| Materials Used | 11 | 12 | 13 | 14 | 15 | 16 | 17 | 18 | 19 | 20 |
|---|---|---|---|---|---|---|---|---|---|---|
| Polyethylene 629 | 10.37 | 10.37 | 10.37 | 10.37 | 10.37 | 10.60 | 12.00 | 10.62 | 10.72 | 10.86 |
| Phenylstearic acid | 1.81 | — | 1.81 | — | 1.36 | — | — | 1.61 | 1.51 | 1.41 |
| Hydroxyphenylstearic | — | 1.81 | — | 1.81 | 0.45 | 1.81 | 1.00 | — | — | — |
| Carboxystearic acid | — | — | — | — | — | — | 0.20 | 0.20 | 0.30 | 0.40 |
| Morpholine | 1.81 | 1.81 | 2.61 | 2.61 | 1.81 | 1.59 | 1.00 | 1.57 | 1.46 | 1.32 |
| Water | 86.01 | 86.01 | 86.01 | 86.01 | 86.01 | 86.01 | 85.80 | 86.00 | 86.00 | 86.01 |
| % Neutralization | 403 | 423 | 582 | 610 | 414 | 372 | 291 | 311 | 274 | 236 |

| Materials Used | 21 | 22 | 23 | 24 | 25 | 26 | 27 | 28 | 29 | 30 |
|---|---|---|---|---|---|---|---|---|---|---|
| Polyethylene 629 | 10.37 | 10.50 | 10.50 | 10.50 | 10.50 | 10.50 | 10.50 | 10.50 | 10.50 | 10.50 |
| Phenylstearic acid | 1.61 | 1.34 | 1.60 | 1.99 | 1.07 | 1.29 | 1.60 | 0.81 | 0.99 | 1.26 |
| Carboxystearic acid | 0.54 | 0.45 | 0.54 | 0.67 | 0.65 | 0.78 | 1.00 | 0.81 | 0.99 | 1.26 |
| Morpholine | 1.44 | 1.71 | 1.36 | 0.84 | 1.78 | 1.43 | 0.90 | 1.88 | 1.53 | 0.98 |
| Water | 86.04 | 86.00 | 86.00 | 86.00 | 86.00 | 86.00 | 86.00 | 86.00 | 86.00 | 86.00 |
| % Neutralization | 211 | 315 | 200 | 99 | 301 | 211 | 86 | 300 | 200 | 105 |

The data in Table III shows that phenylstearyl duomeen is more effective than Duomeen T and that the most effective emulsifier is phenylstearyl amine. These emulsions can be prepared without the addition of stearic acid by underneutralizing the amines with acetic acid, but a higher emulsifier level is required. Based on these emulsions, the HLB of phenylstearyl duomeen acetate is about 13–14 and the HBL of phenylstearyl amine is about 12.

The derivatives of the phenylstearyl amines of the present invention are superior fabric softeners as indicated in U.S. Pat. No. 3,505,221, the disclosure of which is incorporated herein by reference.

The phenylstearyl amine of the present invention has a melting point at about 0°F. compared to straight stearyl amines which melt at a temperature in excess of 70°F. This property is very important commercially because it allows outside storage without the necessity of heating to place the amine in the liquid form.

Standard products derived from tallow have unsaturation and are susceptible to oxidative attack. In the case of the phenylstearyl amines of the present invention, the molecule is saturated and is not subject to normal atmospheric oxidative attack.

The phenylstearyl amines of the present invention and their derivatives are also excellent weed killers.

Having fully described our invention, it is to be understood that we do not wish to be limited to the details set forth, but our invention is of the full scope of the appended claims.

We claim:

1. Amines having the formula:

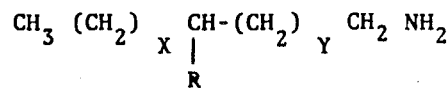

wherein Y is greater than 3 and X + Y is 15 and R is an aryl radical.

2. The amines of claim 1 werein R is naphthyl.
3. The amines of claim 1 wherein R is phenyl.
4. The amines of claim 1 wherein R is anisole.
5. The amines of claim 1 wherein R is tolyl.

* * * * *